United States Patent [19]

Mounier-Poulat et al.

[11] Patent Number: 4,643,406

[45] Date of Patent: Feb. 17, 1987

[54] FASTENING OF A LEAF SPRING OF COMPOSITE MATERIAL

[75] Inventors: Francois Mounier-Poulat, Heyrieux; Jean Beaupellet, St. Clair de la Tour; Patrick Gardier, Villeurbanne, all of France

[73] Assignee: Renault Vehicules Industriels, Lyons, France

[21] Appl. No.: 719,242

[22] Filed: Apr. 2, 1985

[30] Foreign Application Priority Data

Apr. 3, 1984 [FR] France .................. 84 05212

[51] Int. Cl.$^4$ .................. B60G 11/02; F16F 1/36
[52] U.S. Cl. .................. 267/52; 267/148
[58] Field of Search .......... 267/36 R, 47, 52, 53, 267/54 A, 54 C, 148, 149, 153

[56] References Cited

U.S. PATENT DOCUMENTS

| 2,643,111 | 6/1953 | Burton | 267/52 |
| 2,762,445 | 9/1956 | Polhemus et al. | 267/52 X |
| 3,195,876 | 7/1965 | Tea | 267/52 |
| 3,456,939 | 7/1969 | Duchemin | 267/47 |
| 4,022,449 | 5/1977 | Estorff | 267/53 X |
| 4,141,428 | 2/1979 | Loeb | 267/52 X |
| 4,322,061 | 3/1982 | Masser | 267/52 X |
| 4,519,590 | 5/1985 | Wells | 267/52 |
| 4,519,591 | 5/1985 | Bush et al. | 267/47 X |

FOREIGN PATENT DOCUMENTS

| 0692763 | 11/1930 | France . |
| 0908481 | 10/1962 | United Kingdom . |
| 2068856 | 8/1981 | United Kingdom . |
| 2100835 | 1/1983 | United Kingdom . |

Primary Examiner—Duane A. Reger
Assistant Examiner—Robert J. Oberleitner
Attorney, Agent, or Firm—Oblon, Fisher, Spivak, McClelland & Maier

[57] ABSTRACT

Fastening of a leaf spring of composite material to a heavy vehicle is accomplished by the clamping of clamps acting on metal shoes located on both sides of the leaf spring, on the surface of which are inserted two U-shaped rubber pieces. On the inner face of said rubber pieces steel sheets are adhered, whose free face is glued to the leaf of the spring.

6 Claims, 3 Drawing Figures

FASTENING OF A LEAF SPRING OF COMPOSITE MATERIAL

BACKGROUND OF THE INVENTION

This invention relates to the fastening of a leaf spring of composite material, more particularly applicable to heavy vehicles.

Leaf springs of composite material can be obtained by molding or pultrusion. In this case, there is preferably used a thermosetting resin of the polyester or epoxy type including a catalyst that can be activated with heat, and reinforced with unidirectional elements such as wires, glass fibers or strips. Because of this, the products obtained exhibit an anisotropy of their mechanical strength, which very appreciably differentiates them from steel spring leaves; consequently, the usual techniques for fastening steel springs are not transferable to leaf springs of composite material.

Fastenings for composite material leaf springs, as applied on the axle or the axle assembly of a motor vehicle, are known. For example, it has been known to use a bolted-connection of the leaf of synthetic material to the axle assembly, which exhibits the main drawback of weakening the leaf at the opening for the passage of the bolt.

The fastening can also be assured by unregulated clamping of a flange placed directly on the leaf of the spring, which can lead to crushing of the composite material, whose strength in the direction perpendicular to the reinforcement fibers is weak.

A limited intensity clamping of the leaf could also be performed by inserting a rubber element between the clamping flange and the leaf. However, the adherence between the rubber element and the leaf which is intended to take up longitudinal forces particularly when starting and braking the vehicle, while acceptable for an automobile, is insufficient for heavy weight vehicles.

SUMMARY OF THE INVENTION

This invention has as its object a device for fastening springs of composite material to a suspension element, in particular to an axle, while eliminating the previous drawbacks and allowing good compensation of possible longitudinal forces.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
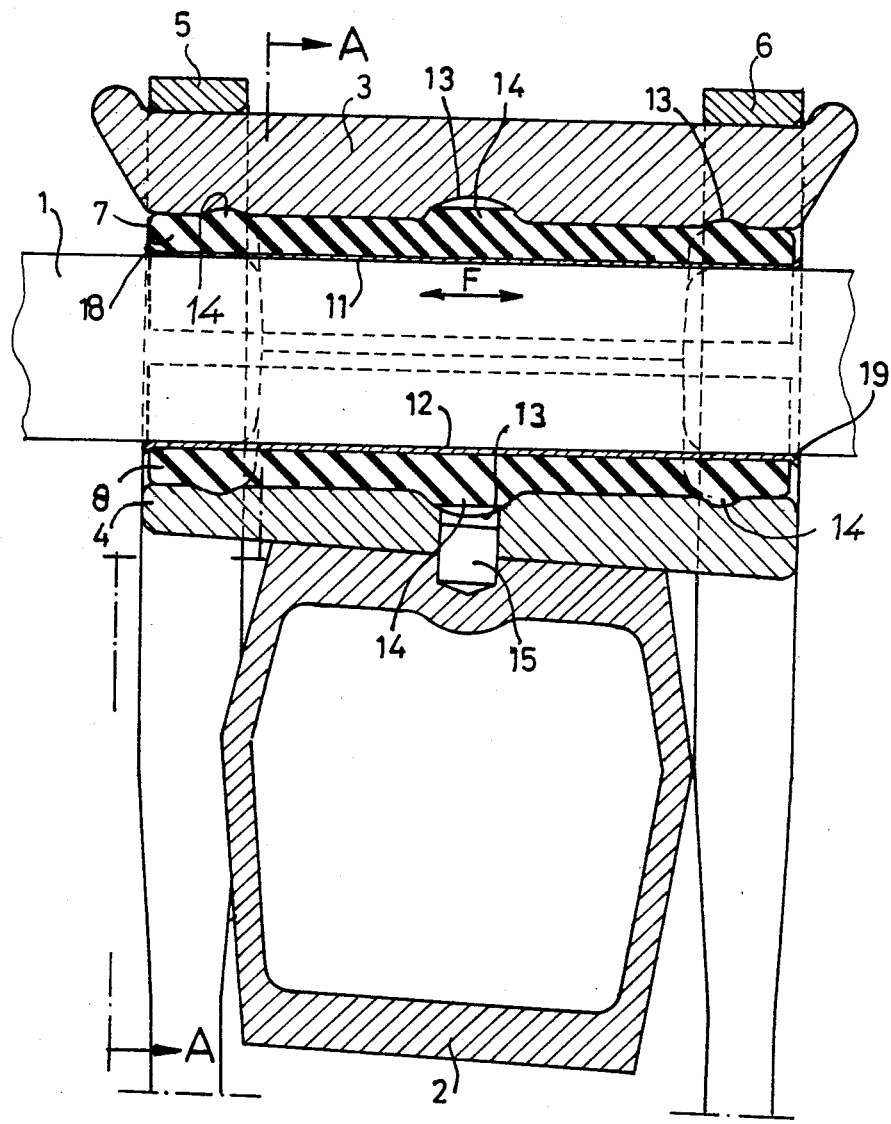
FIG. 1 is a partial view, in longitudinal section, of the fastening system of the invention.

With reference to FIG. 1, the fastening of known spring leaf 1 of synthetic material reinforced with fibers to axle 2 is provided by the clamping onto the leaf of two metal shoes 3 and 4 by clamps 5 and 6, placed at the front and back ends of the shoes.

Located between shoes and leaf 1 are two U-shaped rubber pieces 7 and 8 whose legs 9 and 10 partially cover the vertical and lateral sides of leaf 1. Steel sheets 11 and 12, glued to leaf 1 are positioned on, and glued to, the inner faces of rubber pieces 7 and 8. These sheets 11 and 12 constitute a necessary intermediary for bonding leaf 1 of reinforced synthetic material and rubber pieces 7 and 8, whose direct bond with a structural glue is not possible if one is to take up the longitudinal forces arising in the acceleration and braking phases of a heavy vehicle, as shown by arrow F. In addition, these sheets 11 and 12 improve the distribution of the pressures on leaf 1 and, because of their curved ends 19, avoid concentrations of stresses at right angles to the fixed end of the spring in the flanging device.

It will be noted that the surfaces of shoes 3 and 4 in contact with pieces 7 and 8 include depressions 13 totally or partially filled by extra thicknesses 14 of rubber pieces 7 and 8 so as to make possible a good relative hold of pieces 7 and 8.

A pin 15, assures the positioning of shoe 4 on axle 2 by fitting in a depression 13 and a bore of the axle.

Figure 2:
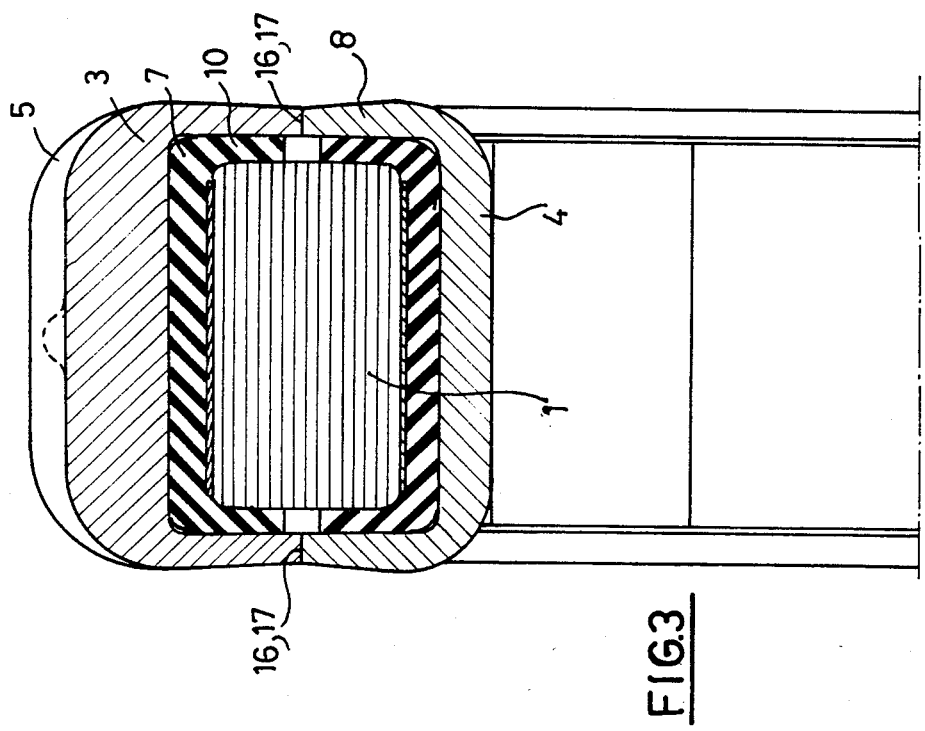
FIG. 2 is a cross section view along A—A of FIG. 1 before clamping.
Figure 3:
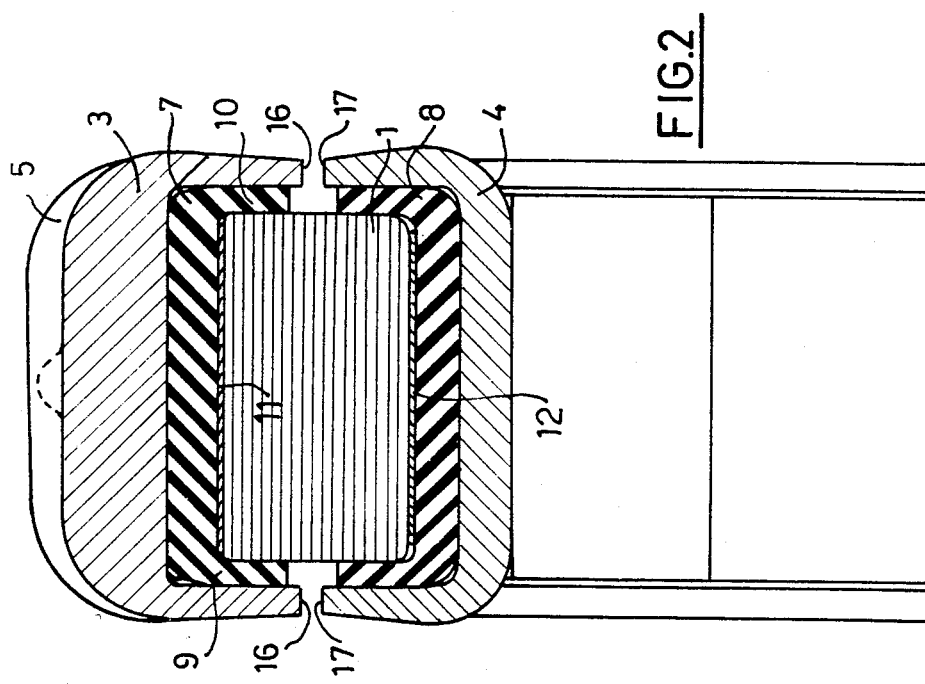
FIG. 3 is a view similar to FIG. 2 after clamping.

With reference to FIGS. 2 and 3, there may be observed the effect of the clamping of clamps 5 and 6 on the parts of the invention. This effect will continue until opposing faces 16 and 17 of shoes 3 and 4 are in contact. Such contact constitutes a positive stop. When this is the case, rubber pieces 7 and 8 will have reached a thickness at 18 corresponding to a regulated compression, for which they will distribute forces to the surface of leaf 1 of composite material, while allowing a certain clearance between the leaf and shoes and while damping the transmission of the vibrations of the axle to the frame of the vehicle.

Obviously, numerous modifications and variations of the present invention are possible in light of the above teachings, it is therefore to be understood that within the scope of the appended claims, the invention may be practiced otherwise than as specifically described herein.

What is claimed as new and desired to be secured by Letters Patent of the United States is:

1. In an assembly of a fiber reinforced plastic composite leaf spring and a suspension element of a vehicle, means for fastening said leaf spring to said suspension element, comprising:
   - metal shoes located on two sides of said leaf spring, at least one of said shoes being fixed to said suspension element;
   - U-shaped rubber pieces positioned between each of said shoes and said leaf spring, each of said rubber pieces having a face corresponding in shape to said leaf spring;
   - a steel sheet positioned between each said rubber piece and said leaf spring, each said sheet being bonded to said rubber piece and to said leaf spring and having curved ends; and
   - means for clamping said metal shoes to said leaf spring with said rubber pieces and steel sheets therebetween, whereby said leaf spring is not damaged by a clamping force of said metal shoes.

2. The assembly of claim 1, wherein said shoes have opposing faces which contact one another when said clamping means clamp said shoes to said leaf spring with a predetermined force.

3. The assembly of claim 1, wherein each of said shoes includes a depression in a face engaging one said rubber piece, whereby a portion of said rubber piece fits in said depression.

4. The assembly of claim 1, including a pin connected between said suspension element and one of said shoes for providing said fixing of said shoe to said suspension element.

5. The assembly of claim 1, wherein said suspension element is an axle.

6. The leaf spring of claim 1, wherein said curved ends curve away from said leaf spring.

* * * * *